United States Patent [19]
Kawashukuda et al.

[11] Patent Number: 5,762,824
[45] Date of Patent: Jun. 9, 1998

[54] LIQUID CRYSTAL COMPOSITION AND LIQUID CRYSTAL DISPLAY ELEMENT

[75] Inventors: Hiroaki Kawashukuda; Kanetsugu Terashima; Hitoshi Yamamoto, all of Shigaken, Japan

[73] Assignee: Chisso Corporation, Osaka, Japan

[21] Appl. No.: 748,512

[22] Filed: Nov. 8, 1996

[30] Foreign Application Priority Data

Nov. 10, 1995 [JP] Japan .................................. 7-317463

[51] Int. Cl.[6] .................... C09K 19/00; C09K 19/32; C09K 19/12; C09K 19/54
[52] U.S. Cl. .................... 252/299.1; 252/299.62; 252/299.63; 252/299.66
[58] Field of Search ........................ 252/299.62, 299.1, 252/299.63, 299.66

[56] References Cited

U.S. PATENT DOCUMENTS

| | | | |
|---|---|---|---|
| 4,596,666 | 6/1986 | Blunck et al. | 252/299.01 |
| 5,006,276 | 4/1991 | Kaneko et al. | 252/299.1 |
| 5,439,613 | 8/1995 | Takeshita et al. | 252/299.63 |
| 5,582,766 | 12/1996 | Jeon | 252/299.62 |
| 5,589,100 | 12/1996 | Grasso et al. | 252/299.01 |

*Primary Examiner*—C. H. Kelly
*Attorney, Agent, or Firm*—Leydig, Voit & Mayer, Ltd.

[57] ABSTRACT

A guest-host liquid crystal is provided by adding a quinophthalone group pigment or an anthraquinone group pigment as a non-azoic group dichroic pigment, to a host liquid crystal composition composed mainly of a halogenated benzene derivative, and having a high voltage-holding ratio of $\Delta\epsilon$ of 4.5 to 7.5. By combining a host liquid crystal composition composed mainly of a halogenated benzene derivative and having a high voltage-holding ratio of $\Delta\epsilon$ of 4.5 to 7.5, with a dichroic pigment having a specified, molecular structure, there is exhibited an effectiveness that it is possible to obtain a guest-host liquid crystal active matrix display element of 3.3V drive having stability under high temperature.

20 Claims, 1 Drawing Sheet

LIQUID CRYSTAL COMPOSITION AND LIQUID CRYSTAL DISPLAY ELEMENT

BACKGROUND OF THE INVENTION

This invention relates to a liquid crystal composition for liquid crystal display and a liquid crystal display element using the same. More in detail, it relates to a nematic liquid crystal composition for an active matrix drive liquid crystal display, applying the guest-host effect of, e.g., a White-Tailor mode, and an active matrix drive liquid crystal drive liquid crystal display element using the same.

In an active matrix drive liquid crystal display element such a thin film transistor, liquid crystal materials should hold an accumulated charge between frame frequencies. Thus, it has been indispensable to use as a liquid crystal material, a liquid crystal composition composed mainly of a halogenated benzene derivative having a substituent such as a fluorine atom, a chlorine atom, a fluoromethyl group such as a trifluoromethyl group, or a fluoromethoxy group such as trifluoromethoxy group, which is a material having a high retainability of a accumulated charge between frame frequencies, i.e. a high voltage-holding ratio.

However, if a dichroic pigment is added to these liquid crystal materials, the voltage-holding ratio characteristic of the host liquid crystal material is harmed, due to the thermal deterioration of the dichroic pigment. Further, when the dielectric anisotropy ($\Delta\epsilon$) of host liquid crystal material exceeds 7.5, a problem may occur whereby the voltage-holding ratio characteristic in an aging test such as an electricity-passing test at high temperatures, test allowed to stand, etc. is degraded, thereby causing an inferior alignment. On the contrary, when the dielectric anisotropy ($\Delta\epsilon$) of the host liquid crystal material is 4.5 or less, 3.3V drive in an active matrix drive guest-host liquid crystal display element was difficult.

PROBLEM TO BE SOLVED BY THE INVENTION

The present inventors have extensively researched the problem of inferior alignment which occurs due to degradation of the voltage-holding ratio, etc. in a reliability test, etc. of high temperature electricity-passing, etc. of a guest-host liquid crystal composition. As a result, we have found that when a host liquid crystal composition having a high voltage-holding ratio composed mainly of a dichroic pigment having a specified molecular structure and a halogenated benzene derivative is employed and a chiral dopant is further added thereto, the voltage-holding ratio of the resulting guest-host liquid crystal composition is almost unchanged even before or after a high temperature test allowed to stand, at 100° C. for 100 hours, and have reached the present invention.

Namely, the object of the present invention is to provide an active matrix drive guest-host liquid crystal composition capable of solving the above problems, that is, having a superior stability at high temperatures, and at the same time, having a very low viscosity and a low threshold voltage capable of 3.3V drive, and a liquid crystal display element having a high contrast, a high reliability and a superior response property.

MEANS FOR SOLVING THE PROBLEM

The liquid crystal composition of the present invention consists of the following items (1) to (12):

(1) A guest-host type liquid crystal composition characterized by containing at least one member of non-azoic dichroic pigments in a liquid crystal composition having a dielectric anisotropy ($\Delta\epsilon$) of 4.5 to 7.5 and a high voltage retention.

(2) A liquid crystal composition according to item 1, characterized by containing therein 70% by weight or more of at least one member of compounds selected from the group consisting of those expressed by the following formula I.

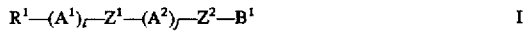

$$R^1-(A^1)_i-Z^1-(A^2)_j-Z^2-B^1 \qquad I$$

wherein $R^1$ represents an alkyl group of 1 to 10 carbon atoms wherein one —$CH_2$— group or two non-adjacent —$CH_2$— groups present in group $R^1$ may be replaced by an oxygen atom; $A^1$ and $A^2$ each independently represent a 1,4-cyclohexylene or a 1,4-phenylene group; i and j each represent 0 or 1 and i+j is 1 or 2; $Z^1$ and $Z^2$ each independently represent —COO—, —$CH_2CH_2$— or a single bond; $B^1$ represents a 3,4-difluorophenyl group or a 4-trifluoromethoxyphenyl group, each bonded to $Z^2$ at the 1-position.

(3) A liquid crystal composition according to item 1, characterized by containing as a first component, 20 to 90% by weight of at least one member of compounds selected from the group consisting of those expressed by the formula I.

$$R^1-(A^1)_i-Z^1-(A^2)_j-Z^2-B^1 \qquad I$$

wherein $R^1$ represents an alkyl group of 1 to 10 carbon atoms wherein one —$CH_2$— group or two non-adjacent —$CH_2$— groups present in group $R^1$ may be replaced by an oxygen atom; $A^1$ and $A^2$ each independently represent a 1,4-cyclohexylene or a 1,4-phenylene group; i and j each represent 0 or 1 and i+j is 1 or 2; $Z^1$ and $Z^2$ each independently represent —COO—, —$CH_2CH_2$— or a single bond; $B^1$ represents a 3,4-difluorophenyl group or a 4-trifluoromethoxyphenyl group, each bonded to $Z^2$ at the 1-position; and as a second component, 3 to 74% by weight of at least one member of compounds selected from the group consisting of those expressed by the formula II.

$$R^2-(A^3)_k-Z^3-(A^4)_l-Z^4-B^2 \qquad II$$

wherein $R^2$ represents an alkyl group of 1 to 10 carbon atoms, wherein one —$CH_2$— group or two non-adjacent —$CH_2$— groups present in group $R^2$ may be replaced by an oxygen atom; $A^3$ and $A^4$ each independently represent a 1,4-cyclohexylene or a 1,4-phenylene; k and l each represent 0 or 1 and k+l=1 or 2; $Z^3$ and $Z^4$ each independently represent —COO—, —$CH_2CH_2$— or a single bond; $B^2$ represents a 3,4,5-trifluorophenyl group or a 3,5-difluoro-4-difluoromethoxyphenyl group, each bonded to $Z^4$ at the 1-position; and when $B^2$ represents a 3,5-difluoro-4-difluoromethoxyphenyl group, $A^3$ and $A^4$ each represent a 1,4-cyclohexylene and k and l each represent 1, and $Z^3$ and $Z^4$ each represent a single bond; and as another component, 0 to 77% by weight of another liquid crystalline compound.

(4) A liquid crystal composition according to item 2 or item 3, characterized by further containing, as a third component, 3 to 30% by weight as an outer percentage of at least one member of compounds selected from the group consisting of those expressed by the following formula III:

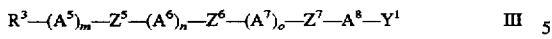

wherein $R^3$ represents an alkyl group of 1 to 10 carbon atoms wherein one —$CH_2$— group or two non-adjacent —$CH_2$— groups present therein may be replaced by oxygen atom; $A^5$, $A^6$, $A^7$ and $A^8$ each independently represent 1,4-cyclohexylene or 1,4-phenylene; m, n and o each represent 0 or 1 and m+n+o=1, 2 or 3; $Z^5$, $Z^6$ and $Z^7$ each independently represent —COO—, —$CH_2CH_2$— or a single bond; $Y^1$ represents a halogen atom, an alkyl group, an alkoxy group or a alkoxyalkyl group, and when $Y^1$ represents an alkyl group, an alkoxy group or an alkoxyalkyl group, if $A^6$ represents 1,4-phenylene, the H atom at 3-position thereof may be replaced by F atom.

(5) A liquid crystal composition according to item 1, characterized by containing as a first component, 50 to 88% by weight of at least one compound selected from the group consisting of those expressed by the following formula II; as a second component, 7 to 40% by weight of at least one compound selected from the group consisting of those expressed by the following formula III; and 0 to 40% by weight of another liquid crystalline compound,

wherein $R^2$ represents an alkyl group of 1 to 10 carbon atoms, wherein one —$CH_2$— group or two non-adjacent —$CH_2$— groups present therein may be replaced by an oxygen atom; $A^3$ and $A^4$ each independently represent 1,4-cyclohexylene or 1,4-phenylene; k and l each represent 0 or 1 and k+l=1 or 2; $Z^3$ and $Z^4$ each independently represent —COO—, —$CH_2CH_2$— or a single bond; and $B^2$ represent a 3,4,5-trifluorophenyl group or a 3,5-difluoro-4-difluoromethoxyphenyl group, and when $B^2$ represents a 3,5-difluoro-4-difluoromethoxyphenyl group, $A^3$ and $A^4$ each represent 1,4-cyclohexylene and k and l each represent 1 and $Z^3$ and $Z^4$ each represent single bond,

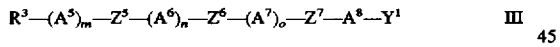

wherein $R^3$ represents an alkyl group of 1 to 10 carbon atoms wherein one —$CH_2$— group or two non-adjacent —$CH_2$— groups present therein may be replaced by an oxygen atom; $A^5$, $A^6$, $A^7$ and $A^8$ each independently represent 1,4-cyclohexylene or 1,4-phenylene; m, n and o each represent 0 or 1 and m+n+o=1, 2 or 3; $Z^5$, $Z^6$ and $Z^7$ each independently represent —COO—, —$CH_2CH_2$— or a single bond; $Y^1$ represents a halogen atom, an alkyl group, an alkoxy group or an alkoxyalkyl group and when $Y^1$ represents an alkyl group, alkoxy group or an alkoxyalkyl group, if $A^6$ represents 1,4-phenylene, then the H atom at the 3-position may be replaced by an F atom.

(6) A liquid crystal composition according to either one of items 2 to 5, characterized by further containing, as a fourth component, 3 to 30% by weight as an outer percentage of at least one member of compounds selected from the group consisting of those expressed by the following formula IV:

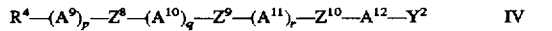

wherein $R^4$ represents an alkyl group of 1 to 10 carbon atoms wherein one —$CH_2$— group or two non-adjacent —$CH_2$— groups present in the group may be replaced by an oxygen atom; $A^{12}$ represents 1,4-phenylene; $A^9$, $A^{10}$ and $A^{11}$ each independently represent 1,4-cyclohexylene or 1,4-phenylene, but either one thereof is always 1,4-phenylene; three or more H atoms optionally selected from those at the 3-position or the 5-position of $A^9$, $A^{10}$, $A^{11}$ and $A^{12}$ may be replaced by an F atom; p, q and r each represent 0 or 1, and p+q+r=1, 2 or 3; $Z^8$, $Z^9$ and $Z^{10}$ each independently represent —COO—, —$CH_2CH_2$— or a single bond; and $Y^2$ represents a halogen bond.

(7) A liquid crystal composition according to either one of items 2 to 6, wherein, in the formula I, $R^1$ represents an alkyl group of 1 to 10; $A^1$ an $A^2$ each independently represent 1,4-cyclohexylene or 1,4-phenylene; i and j each represent 0 or 1 and i+j=1 or 2; $Z^1$ and $Z^2$ each independently represent —COO—, —$CH_2CH_2$— or a single bond; and $B^1$ represents a compound representing a 3,4-difluorophenyl group or a 4-trifluoromethoxy phenyl group, bonded to $Z^2$ at 1-position, in the formula II, $R^2$ represents an alkyl group of 1 to 10 carbon atoms; $A^3$ and $A^4$ each independently represent 1,4-cyclohexylene or 1,4-phenylene; k and l represent 0 or 1 and k+l=1 or 2; $Z^3$ and $Z^4$ each independently represent —COO—, —$CH_2CH_2$— or a single bond; $B^2$ represents a 3,4,5-trifluorophenyl group or a 3,5-difluoro-4-difluoromethoxyphenyl group, each bonded to $Z^4$ at the 1-position, and when $B^2$ represents 3,5-difluoro-4-difluoromethoxyphenyl group, $A^3$ and $A^4$ each represent 1,4-cyclohexylene; k and l each represent 1 and $Z^3$ and $Z^4$ each represent a single bond, in the formula III, $R^3$ represents an alkyl group of 1 to 10 carbon atoms; $A^5$, $A^6$, $A^7$ and $A^8$ each independently represent 1,4-cyclohexylene or 1,4-phenylene; m, n and o each represent 0 or 1 and m+n+o represents 1, 2 or 3; $Z^5$, $Z^6$ and $Z^7$ each independently represent —COO—, —$CH_2CH_2$— or a single bond; $Y^1$ represents a halogen atom, an alkyl group, an alkoxygroup or an alkoxyalkyl group, and when $Y^1$ represents an alkyl group, if $A^6$ represents 1,4-phenylene, the H atom at the 3-position may be replaced by an F atom, and in the formula IV, $R^4$ represents an alkyl group of 1 to 10 carbon atoms; $A^{12}$ represents 1,4-phenylene; $A^9$, $A^{10}$ and $A^{11}$ each independently represent 1,4-cyclohexylene or 1,4-phenylene, but either one of them is always 1,4-phenylene, and 3 or more H atoms optionally chosen from those at the 3-position or the 5-position on $A^9$, $A^{10}$ or $A^{11}$ may be replaced by an F atom; p, q and r each represent 0 or 1; p+q+r represents 1, 2 or 3; $Z^8$, $Z^9$ and $Z^{10}$ each represent a single bond; and $Y^2$ represents a halogen atom.

(8) A liquid crystal composition according to either one of items 1 to 7, characterized by having a smectic phase between a nematic phase and a crystalline phase.

(9) A liquid crystal composition according to either one of items 1 to 8, characterized in that said non-azoic dichroic pigment is a quinophthalone pigment or a anthraquinone pigment represented by the following formulas V to XIII:

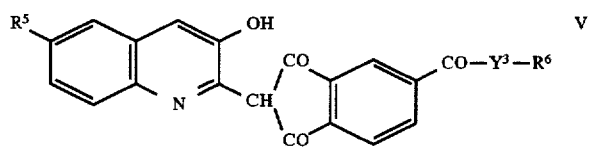

wherein $Y^3$ represents an O atom or an S atom; $R^5$ represents an H atom or an alkyl group; $R^6$ represents an alkyl group or a cycloalkyl group, an alkoxyalkyl group, an aryl group or an aralkyl group which may have a substituent,

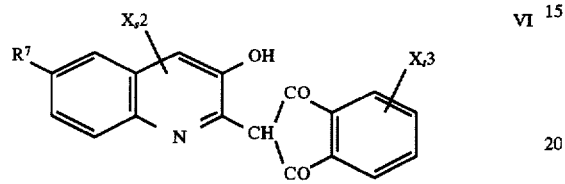

wherein $R^7$ represents an H atom or an alkyl group; $X^2$ represents an H atom or a halogen atom; s represents 1 or 2; $X^3$ represents an H atom, a halogen atom or a group represented by the following formula VI-1

wherein $R^8$ and $R^9$ each represent an H atom, an alkyl group, an alkoxyalkyl group or a cyclohexyl group which may contain a substituent of an alkoxy group or a phenyl group which may contain a substituent of an alkyl group or an alkoxy group; and t represents 1 or 2, but when $X^2$ represents the formula VI-1, t represents 1,

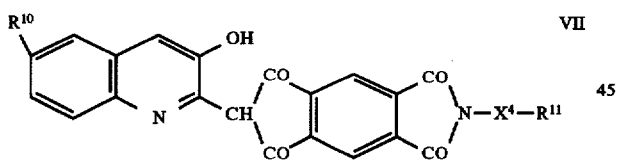

wherein $R^{10}$ represents H atom, a halogen atom, an alkyl group, an alkoxyalkyl group, an alkoxy group, an alkylphenyl group, an alkoxyphenyl group or a substituent expressed by the following formula VII-1:

wherein $R^{12}$ represents an H atom, an alkyl group, an alkoxyalkyl group or an alkoxy group; $Y^4$ represents a 1,4-phenylene group or a 1,4-cyclohexylene group; $R^{11}$ represents an H atom, a halogen atom, an alkyl group, an alkoxyalkyl group or an alkoxy group; and $X^4$ represents a phenylene group which may have a halogen group, an alkyl group or an alkoxy group at an ortho position or a meta position,

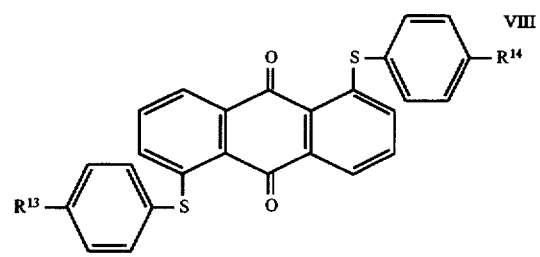

wherein $R^{13}$ and $R^{14}$ each represent an H atom, a halogen atom, an alkyl group or a cycloalkyl group which may have a substituent, an alkoxyalkyl group or an alkoxy group,

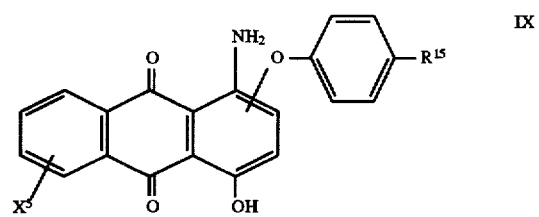

wherein $R^{15}$ represents an H atom, a halogen atom, an alkyl group, an alkoxyalkyl group or an alkoxy group or a cyclohexyl group which may have an alkoxy group or an alkyl group; and $X^5$ represents an H atom, a halogen atom or a carboxylic acid ester group which may have a substituent,

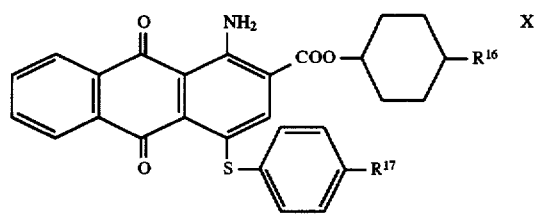

wherein $R^{16}$ and $R^{17}$ each represent an H atom, a halogen atom, an alkyl group, an alkoxyalkyl group or a cyclohexyl group which may have an alkoxy group or an alkyl group,

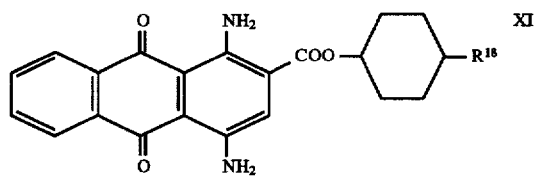

wherein $R^{18}$ represents an H atom, an alkyl group, an alkoxyalkyl group, an alkoxy group or a halogen atom,

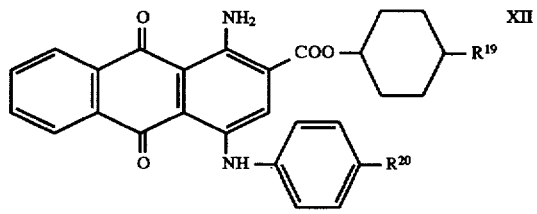

wherein $R^{19}$ and $R^{20}$ each represent an H atom, an alkyl group, an alkoxyalkyl group, an alkoxy group or a halogen atom, and

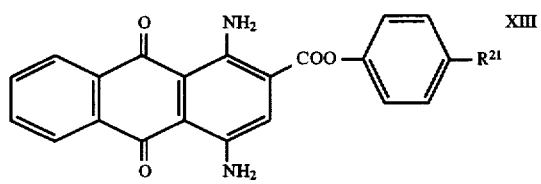

wherein $R^{21}$ represents an H atom, an alkyl group, an alkoxyalkyl group, an alkoxy group or a halogen atom.

(10) A liquid crystal composition according to either one of items 1 to 9, characterized by adding an optically active substance represented by the following formulas XIV to XVI:

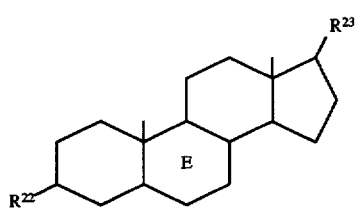

wherein $R^{22}$ represents an H atom, a halogen atom, an alkyl group, an alkoxyalkyl group, an alkanoyl group, an alkoxy group, an alkanoyloxy group, or a cyclohexyl group or a phenyl group which may have an alkanoyl group, an alkanoyloxy group, an alkoxy group or an alkyl group; $R^{23}$ represents an alkyl group; and the ring E represents a condensed ring having only one double bond without sharing it with another ring, or a condensed ring which may be replaced by an alkyl group or an alkoxy group at the 5-position or 6-position.

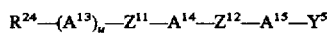

wherein $R^{24}$ represents an alkyl group; $A^{13}$, $A^{14}$ and $A^{15}$ each independently represent 1,4-cyclohexylene or 1,4-phenylene and an H atom at a lateral position of 1,4-phenylene may be optionally replaced by an F atom; u represents an integer of 0 or 1; $Z^{11}$ and $Z^{12}$ each represent a single bond or —CH₂CH₂—, but do not simultaneously represent —CH₂CH₂—; and $Y^5$ is represented by the following partial formula XVI:

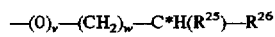

wherein v and w each independently represent an integer of 0 or 1; $R^{25}$ represents an F atom or a methyl group; and $R^{26}$ represents an alkyl group of two or more carbon atoms.

(11) A liquid crystal display element characterized by being composed by using a liquid crystal composition according to either one of items 1 to 10.

Compounds of the respective components constituting the liquid crystal compositions of the present invention will be described below.

The compounds expressed by the formula I, constituting the first component, exhibit a high voltage-holding ratio, a low viscosity and a Δε of about 3 to 6. When this first component is added to another component or a liquid crystal composition, it is possible to adjust its Δε within a range of 4.5 to 7.5 and also to elevate its voltage-holding ratio.

These compounds assume an important role at the time of providing a host liquid crystal composition for realizing an 3.3V drive having a high reliability. Compounds preferred are those expressed by the formula I are those wherein $R^1$ represents an alkyl group of 1 to 10 carbon atoms; $A^1$ and $A^2$ each independently represent 1,4-cyclohexylene or 1,4-phenylene; i and j each represent 0 or 1 and i+j represents 1 or 2; $Z^1$ and $Z^2$ each independently represent —COO—, —CH₂CH₂— or a single bond; and $B^1$ represents a 3,4-difluorophenyl group or a 4-trifluoromethoxyphenyl group, coupled to $Z^2$ at the 1-position.

As specific examples, the following compounds are mentioned:

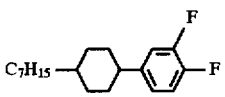
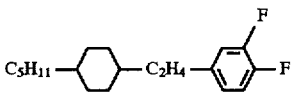
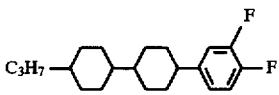
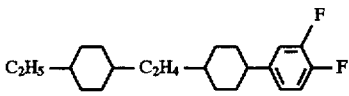
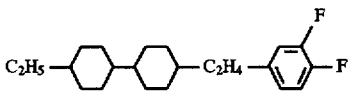
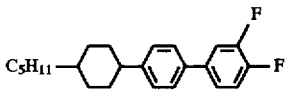
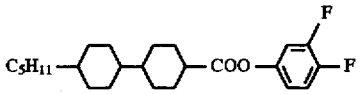
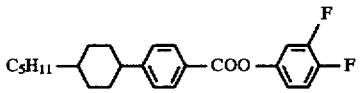
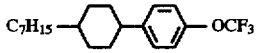
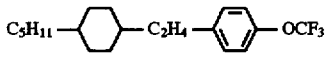
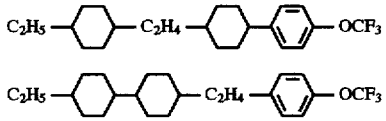
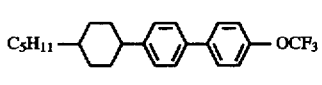
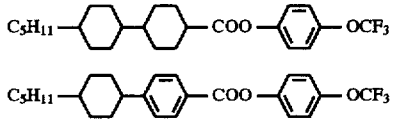

The compounds expressed by the formula II, constituting the second component, exhibit a high voltage-holding ratio, a relatively low viscosity and a Δε of about 8 to 12. When this second component is added to another compound or liquid crystal composition, it is possible to easily adjust the Δε within a range of 4.5 to 7.5, and elevate the voltage-holding ratio. These compounds assume an important role at the time of providing a host liquid crystal composition for realizing 3.3V drive in the present invention. As the compounds expressed by the formula II of the present invention, preferred compounds are those wherein $R^2$ exhibits an alkyl group of 1 to 10 carbon atoms; $A^3$ and $A^4$ each independently represent 1,4-cyclohexylene or 1,4-phenylene; k and 1 each represent 1 or 0 and k+1=1 or 2; $Z^3$ and $Z^4$ each independently —COO—, —CH$_2$CH$_2$— or an single bond; $B^2$ represents a 3,4,5-triphenyl group or a 3,5-difluoro-4-difluoromethoxyphenyl group coupled to $Z^4$ at 1-position and when $B^2$ represents 3,5-difluoro-4-difluoromethoxyphenyl group, $A^3$ and $A^4$ each represent 1,4-cyclohexylene, k and 1 each represent 1 and $Z^3$ and $Z^4$ each represent single bond. As specific examples, the following compounds are mentioned:

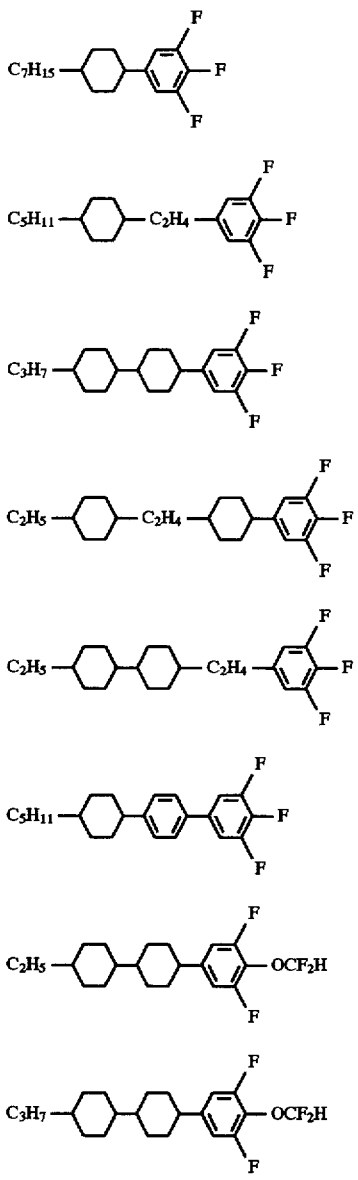

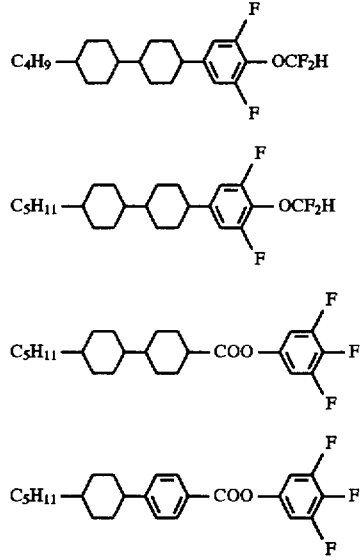

Compounds expressed by the formula III, constituting the third component, exhibit a high voltage-holding ratio, a very low viscosity and a Δε of about 0 to 2. When this third component is added to another liquid crystal compound or a liquid crystal composition, it is possible to reduce the viscosity of the liquid crystal composition and elevate the voltage-holding ratio. The compounds assume an important role at the time of providing a host liquid crystal composition particularly realizing a high speed response property in the present invention.

Preferable compounds are those expressed by the formula III wherein $R^3$ represents an alkyl group of 1 to 10 carbon atoms; $A^5$, $A^6$, $A^7$ and $A^8$ each independently represent 1,4-cyclohexylene or 1,4-phenylene; m, n and o each represent 0 or 1 and m+n+o=1, 2 or 3; $Z^5$, $Z^6$ and $Z^7$ each independently —COO—, —CH$_2$CH$_2$— or a single bond; $Y^1$ represents a halogen atom, an alkyl group, an alkoxy group or an alkoxyalkyl group and when $Y^1$ represents an alkyl group, if $A^6$ represents 1,4-phenylene, an H atom at its 3-position may be replaced by an F atom. As specific examples the following compounds are mentioned:

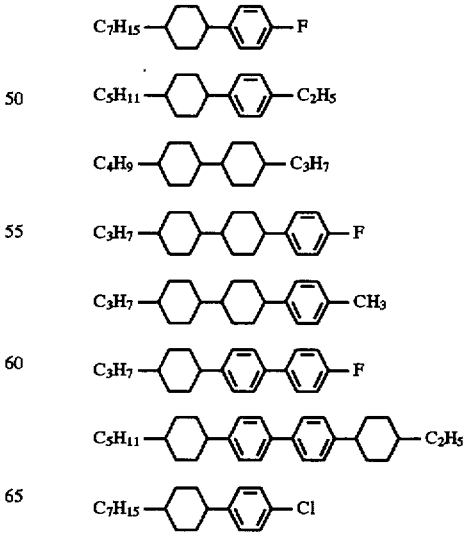

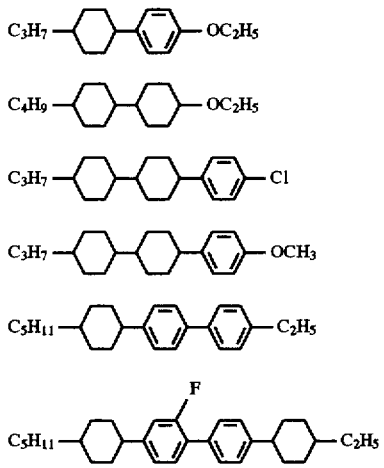

Compounds expressed by the formula IV, constituting the fourth component exhibit a high voltage-holding ratio and a Δε of about 10 to 25. When this fourth component is added to another liquid crystal compound or liquid crystal composition, it is possible to easily adjust the Δε within a range between 4.5 and 7.5, and also to elevate the voltage-holding ratio. These compounds assume an important role for providing a host liquid crystal composition for developing a 3.3V drive.

Preferable compounds are those expressed by the formula IV wherein $R^4$ represents an alkyl group of 1 to 10 carbon atoms; $A^{12}$ represents 1,4-phenylene and $A^9$, $A^{10}$ and $A^{11}$ each independently represent 1,4-cyclohexylene or 1,4-phenylene, but either one of them is always 1,4-phenylene, and optionally chosen 3 or more H atoms at the 3-position or the 5-position of $A^9$, $A^{10}$, $A^{11}$ or $A^{12}$ representing 1,4-phenylene may be replaced by an F atom; p, q and r represent 0 or 1; p+q+r=1, 2 or 3; $Z^8$, $Z^9$ and $Z^{10}$ each represent single bond; and $Y^2$ represents a halogen atom. As specific examples, the following compounds are mentioned:

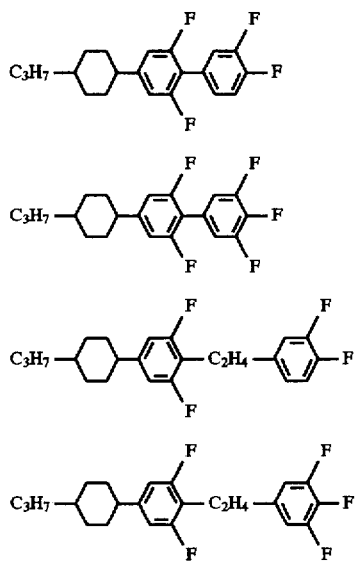

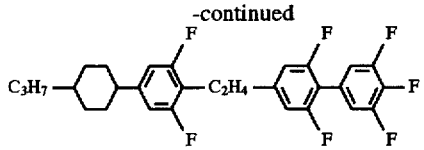

In the liquid crystal composition of the present invention, in the case where it is composed of only the compounds expressed by the formula I, it is preferred to blend the compounds so as to control Δε from 4.5 to 7.5.

When compounds expressed by the formula I and those expressed by the formula II are blended, the blending proportion of the compounds expressed by the formula I is preferably 20 to 90% by weight based upon the total weight of the liquid crystal composition. If the blending ratio is less than 20% by weight, it is impossible to obtain a reliability as one problem of the present invention, while if the blending proportion exceeds 90% by weight, it is impossible to obtain a Δε a value higher than 4.5 and also it is impossible to effect a 3.3V drive as one of the problems of the present invention.

The blending proportion of compounds expressed by the formula II is preferably 3 to 74% by weight based upon the total weight of the liquid crystal composition. If the blending proportion exceeds 74% by weight, Δε value exceeds 7.5; hence it is impossible to achieve the high reliability which is one problem of the present invention.

The blending proportion of compounds expressed by the formula III is preferably 3 to 30% by weight based upon the total weight of the liquid crystal composition. If the blending proportion exceeds 30% by weight, it is impossible to bring about the Δε a value to 4.5 or more, and also it is impossible to effect 3.3V drive which is one problem of the present invention. Further, if it is less than 3% by weight, the viscosity of the resulting liquid crystal composition undesirably becomes high.

When compounds expressed by the formula II as the first component, and those expressed by the formula III as the second component are blended, the blending proportion of the compounds expressed by the formula III is preferably 7 to 40% by weight based upon the total weight of the liquid crystal composition. If the blending proportion is less than 7% by weight, Δε exceeds 7.5; hence it is impossible to obtain a high reliability as a problem of the present invention. Further, if the blending proportion exceeds 40% by weight, it is impossible to obtain a Δε value exceeding 4.5; hence it is impossible to realize 3.3V drive as a problem of the present invention.

The blending proportion of compounds expressed by the formula II is preferably 50 to 88% by weight based upon the total weight of the liquid crystal composition. If the mixing proportion is less than 50% by weight, it is impossible to obtain a Δε value exceeding 4.5, and further, it is impossible to realize 3.3V drive as a problem of the present invention. Further, if the blending proportion exceeds 80% by weight, the Δε value exceeds 7.5; hence, it is impossible to obtain a high reliability as one problem of the present invention.

The blending proportion of compounds expressed by the formula IV as the fourth component is preferably 3 to 30% by weight based upon the total weight of the liquid crystal composition. If the blending proportion exceeds 30% by weight, the Δε value exceeds 7.5; hence it is impossible to obtain a high reliability as one problem of the present invention.

In the phase transition of the liquid crystal composition of the present invention, it is preferred that a smectic phase is present between the nematic phase and the crystalline phase. As compared with the liquid crystal composition having a smectic phase between a nematic phase and a crystalline phase, a liquid crystal composition which causes phase-transition from a nematic phase directly to a crystalline phase, has a smaller order parameter; hence it is impossible to obtain a high grade tone display in a White-Tailor mode, etc.

Further, in the present invention, as a dichroic pigment having a specified molecular structure affording a guest of host liquid crystal composition, compounds expressed by the formulas V to XIII are preferable.

In the formula V, $X^1$ represents an H atom or a halogen atom;

- $R^5$ represents an H atom or a linear or branched alkyl group such as a methyl group, an ethyl group, an propyl group, an butyl group, pentyl group, a hexyl group, an octyl group, a nonyl group, a dodecyl group, etc.; and

- $R^6$ represents a linear or branched alkyl group such as a methyl group, an ethyl group, a propyl group, a butyl group, a pentyl group, a hexyl group, an octyl group, a nonyl group, a dodecyl group, etc.; a cycloalkyl group which may contain a substituent, such as a cyclohexyl group which may have a substituent, such as a linear or branched propylcyclohexyl group, butylcyclohexyl group, pentylcyclohexyl group, hexylcyclohexyl group, octylcyclohexyl group, etc.;

- an alkoxyalkyl group such as a methoxymethyl group, butoxymethyl group, methoxypropyl group, ethoxyethyl group, butoxyethyl group, etc.;

- an aryl group such as a phenyl group which may have a substituent such as an alkyl group or alkoxy group, such as a tolyl group, phenyl group, ethylphenyl group, butylphenyl group, octylphenyl group, butoxyphenyl group, octyloxyphenyl group, etc.; and

- an aralkyl group such as a phenylalkyl group, etc. which may be replaced by a benzyl group, a phenetyl group, etc.

In the above formula VI, $R^7$ represents an H atom; a linear or branched alkyl group such as a methyl group, ethyl group, propyl group, butyl group, pentyl group, hexyl group, octyl group, nonyl group, dodecyl group, etc.;

- $X^2$ and $X^3$ each represent a H atom and halogen atom, and when $X^3$ is represented by the above formula VI-1, $R^8$ and $R^9$ each represent an H atom or a linear or branched alkyl group such as a methyl group, a ethyl group, a propyl group, a butyl group, a pentyl group, a hexyl group, a octyl group, a nonyl group, a dodecyl group, a etc.; a linear or branched alkoxyalkyl group such as an methoxymethyl group, a butoxymethyl group, a methoxypropyl group, a ethoxyethyl group, a butoxyethyl group, a etc.; a cyclohexyl group a which may have a substituent of a linear or branched alkyl group such as an cyclohexyl group, a propylcyclohexyl group, a butylcyclohexyl group, a pentylcyclohexyl group, a hexylcyclohexyl group, octylcyclohexyl group, etc.; and a phenyl group which may have a substituent of a linear or branched alkyl group or alkoxy group, such as phenyl, ethylphenyl, butylphenyl, octylphenyl, butoxyphenyl, octyloxyphenyl; etc.

In the formula VII, $R^{10}$ represents an H atom; a halogen atom; a linear or branched alkyl group such as methyl group, ethyl group, propyl group, butyl group, pentyl group, hexyl group, octyl group, nonyl group, dodecyl group, etc.; a linear or branched alkoxyalkyl group such as methoxymethyl group, butoxymethyl group, methoxypropyl group, ethoxyethyl group, butoxyethyl group, etc.; a linear or branched alkoxy group such as methoxy group, ethoxy group, propoxy group, butoxy group, pentoxy group, octoxy group, etc.; a linear or branched alkylphenyl group such as ethylphenyl group, propylphenyl group, butylphenyl group, hexylphenyl group, nonylphenyl group, etc. a linear or branched alkoxyphenyl group such as methoxyphenyl group, ethoxyphenyl group, butoxyphenyl group, pentoxyphenyl group, etc., and

- $R^{11}$ represents an H atom; a halogen atom; a linear or branched alkyl group such as methyl group, ethyl group, propyl group, butyl group, pentyl group, hexyl group, octyl group, nonyl group, dodecyl group, etc.; a linear or branched alkoxyalkyl group such as methoxymethyl group, butoxymethyl group, methoxypropyl group, ethoxyethyl group, butoxyethyl group, etc. a linear or branched alkoxy group such as methoxy group, ethoxy group, propoxy group, butoxy group, pentoxy group, octoxy group, etc.,

- the substituent of phenylene group of $X^4$ which may be substituted, represents a halogen atom; a linear or branched alkyl group such as methyl group, ethyl group, propyl group, butyl group, pentyl group, hexyl group, octyl group, nonyl group, dodecyl group, etc., and a linear or branched alkoxy group such as methoxy group, ethoxy group, propoxy group, butoxy group, pentoxy group, octoxy group, etc.

$R^{12}$ in the formula VII-1 represents an H atom; halogen atom; a linear or branched alkyl group such as a methyl group, ethyl group, propyl group, butyl group, pentyl group, hexyl group, octyl group, nonyl group, dodecyl group, etc.; a linear or branched alkoxyalkyl group such as an methoxymethyl group, butoxymethyl group, methoxypropyl group, ethoxyethyl group, butoxyethyl group, etc.; and a linear or branched alkoxy group such as methoxy group, ethoxy group, propoxy group, butoxy group, pentoxy group, octoxy group, etc.

$R^{13}$ and $R^{14}$ in the above formula VIII represent an H atom; a halogen atom; a linear or branched alkyl group such as a methyl group, ethyl group, propyl group, butyl group, pentyl group, hexyl group, octyl group, nonyl group, dodecyl group, etc.; a cycloalkyl group which may have a substituent group such as a linear or branched alkyl group, etc., such as propylcyclohexyl group, butylcyclohexyl group, pentylcyclohexyl group, hexylcyclohexyl group, octylcyclohexyl group, etc.; a linear or branched alkoxyalkyl group such as methoxymethyl group, butoxymethyl group, methoxypropyl group, ethoxyethyl group, butoxyethyl group, etc.; and a linear or branched alkoxy group such as methoxy group, ethoxy group, propoxy group, butoxy group, pentoxy group, octoxy group, etc.

$R^{15}$ in the above formula IX represents an H atom; a halogen atom; a linear or branched alkyl group such as a methyl group, ethyl group, propyl group, butyl group, pentyl group, hexyl group, octyl group, nonyl group, dodecyl group, etc.; a linear or branched alkoxyalkyl group such as a methoxymethyl group, butoxymethyl group, methoxypropyl group, ethoxyethyl group, butoxyethyl group, etc.; a cyclohexyl group which may have a linear or branched alkoxy group or an alkyl group, such as propoxycyclohexyl group, butoxycyclohexyl group, propylcyclohexyl group, butylcyclohexyl group, pentylcyclohexyl group, hexylcyclohexyl group, octylcyclohexyl group, etc.

$X^5$ represents an H atom; a halogen atom; a carboxylic acid ester such as methoxycarbonyl group, ethoxycarbonyl group, a linear or branched butoxycarbonyl group, octyloxycarbonyl group, butylphenoxycarbonyl group, octylphenoxycarbonyl group, butoxyphenoxycarbonyl group, trans-4-butylcyclohexyloxycarbonyl group, trans-4-octylcyclohexyloxycarbonyl group, etc.

$R^{16}$ and $R^{17}$ in the above formula X represent an H atom; a halogen atom; methyl group, ethyl group; a linear or branched alkyl group such as those of a propyl group, butyl group, pentyl group, hexyl group, octyl group, nonyl group, dodecyl group, etc.; a linear or branched alkoxyalkyl group such as a methoxymethyl group, butoxymethyl group, methoxypropyl group, ethoxyethyl group, butoxyethyl group, etc.; and a linear or branched alkoxy group or a cyclohexyl group which may have an alkyl group such as propoxycyclohexyl group, butoxycyclohexyl group, propylcyclohexyl group, butylcyclohexyl group, pentylcyclohexyl group, hexylcyclohexyl group, octylcyclohexyl group, etc.

$R^{18}$ to $R^{21}$ in the above formulas XI to XIII represent an H atom; a linear or branched alkyl group such as a methyl group, ethyl group, propyl group, butyl group, pentyl group, hexyl group, octyl group, nonyl group, dodecyl group, etc.; and a linear or branched alkoxy group such as methoxymethyl group, butoxymethyl group, methoxypropyl group, ethoxyethyl group, butoxyethyl group, etc.; and a linear or branched alkoxy group such as methoxy group, ethoxy group, propoxy group, butoxy group, pentoxy group, octoxy group, etc.

The concentration of dichroic pigment added is preferred to be usually 10% by weight or less, based upon the host liquid crystal composition.

Further, the optically active substance having a specified molecular structure in the present invention preferably include compounds expressed by the following formulas XIV to XV:

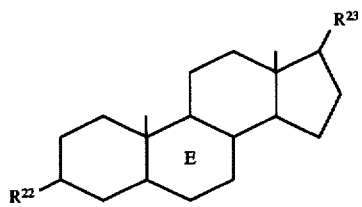

XIV wherein $R^{22}$ represents an H atom, halogen atom, alkyl group, alkoxyalkyl group, alkanoyl group, alkanoyloxy, group or cyclohexyl group or phenyl group which may have alkanoyl group, alkanoyloxy group, alkoxy group or alkyl group; $R^{23}$ represents an alkyl group; and ring E represents a condensed ring having a single double bond without being covalent with other rings, or a condensed rings which may be replaced at its 5-position or 6-position by an alkyl group or an alkoxy group, $$R^{24}-(A^{13})_v-Z^{11}-A^{14}-Z^{12}-A^{15}-Y^5 \quad XV$$

wherein $R^{24}$ represents an alkyl group; $A^{13}$, $A^{14}$ and $A^{15}$ each independently represent 1,4-cyclohexylene or 1,4-phenylene and an H atom at a lateral position may be optionally replaced by F atom; u represents an integer of 0 or 1; $Z^{11}$ and $Z^{12}$ represent a single bond or —$CH_2CH_2$—, but they are not simultaneously —$CH_2CH_2$—; and $Y^5$ is represented by the following partial formula XVI:

$$-(O)_v-(CH_2)_w-C*H(R^{25})-R^{26} \quad XVI$$

wherein v and w independently represent an integer of 0 or 1; $R^{25}$ represents an F atom or a methyl group; and $R^{26}$ represents an alkyl group of 2 or more carbon atoms.

EXAMPLE

The present invention will be described by way of Examples in detail, but it should not be construed to be limited thereto. Further, the compositions in these Examples are all expressed by % by weight.

Abbreviations therein have the following meanings:

NI: nematic-isotropic phase transition point (°C.) of a host liquid crystal (pigment and chiral dopant not yet added)

CN: nematic-crystalline phase transition point (°C.) of a host liquid crystal (pigment and chiral dopant not yet added)

SN: nematic-smectic phase transition point (°C.) of a host liquid crystal (pigment and chiral dopant not yet added)

$\eta 20$: viscosity at 20° C. (mPa·s) of a host liquid crystal (pigment and chiral dopant not yet added)

$\Delta n$: optical anisotropy at 25° C. of a host liquid crystal (pigment and chiral dopant not yet added)

$\Delta \epsilon$: dielectric anisotropy at 25° C. of a host liquid crystal (pigment and chiral dopant not yet added)

$\rho$: direct current specific resistance ($\Omega$·cm) at 25° C. of a host liquid crystal (pigment and chiral dopant not yet added)

Ratio V.H.R. 1 hr.

A guest-host liquid crystal composition is prepared, which has 1 wt. % of either one of dichroic pigments expressed by the following structural formulas XVII to XX, added, and has 4 wt. % of a compound as a chiral agent, expressed by the following structural formula XXI, added.

The above composition is aged at 100° C. for one hour, and the value of the voltage-holding ratio (%) at 100° C. is expressed in terms of a ratio, regarding the voltage-holding ratio of a host liquid crystal (pigment and chiral dopant not yet added) as 1, (azoic pigment of the structural formula XX being shown as comparative example).

Ratio V.H.R. 100 hr.

A guest-host liquid crystal composition is prepared, which has 1 wt. % of either one of the respective dichroic pigments expressed by the following structural formula XVII to XX added, and has 4 wt. % of a compound expressed by the following structural formula XXI added.

The above composition is aged at 100° C., for 100 hr., and the value of the voltage-holding ratio (%) at 100° C. is expressed in terms of a ratio, regarding the voltage-holding ratio of host liquid crystal (pigment and chiral dopant not yet added), as 1, (azoic pigment of the structural formula XX being shown as comparative example):

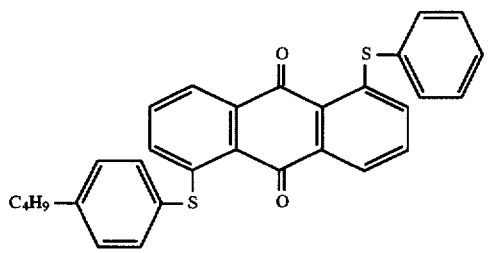

XVII

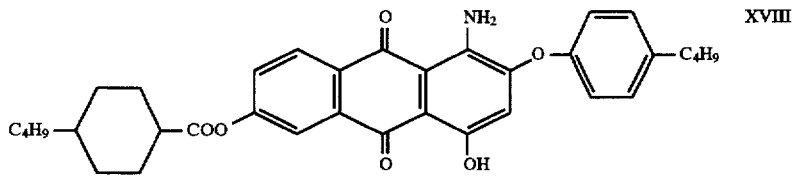

XVIII

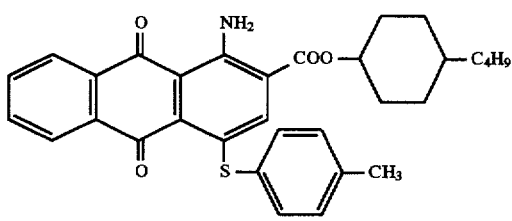

XIX

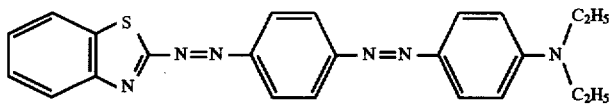

XX

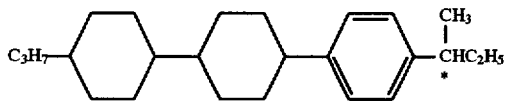

XXI

As to the measurement of the voltage-holding ratio, using a circuit shown in FIG. 1, a signal voltage-holding ratio of a cell having a liquid crystal composition sealed therein is measured. As the liquid crystal cell, a glass substrate provided with transparent electrodes and aligning membranes is used. Next, the waveform at the time of the measurement is shown in FIG. 2. The oblique line portion of Vd refers to a practically observed waveform.

Signal voltage-holding ratio is expressed by the following formula:

Signal voltage-holding ratio=(V1–t1–t2–V2)/[(V1)×(t1–t2)]

wherein (V1–t1–t2–V2) refers to an oblique line portion in FIG. 2; (V1) refers to a source voltage; and (t1–t2) refers to impressed time.

Example 1

A liquid crystal composition consisting of

 16%

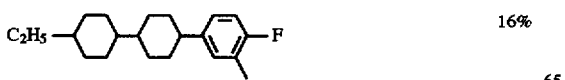 16%

-continued

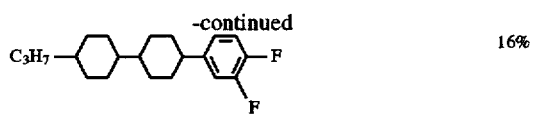 16%

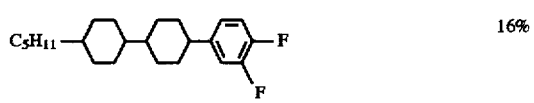 16%

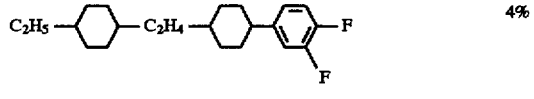 4%

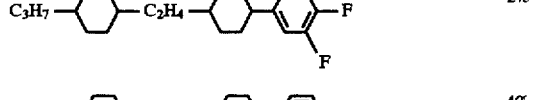 2%

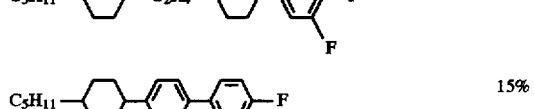 4%

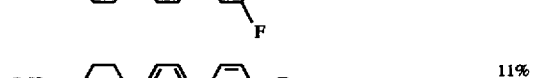 15%

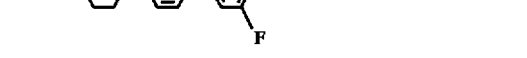 11% has the following parameters and reliabilities:
NI: 76.7° C.

η20: 22.3 mPa·s
Δn: 0.087
Δε: 4.7
ρ: $3*10^{13}$ Ω·cm

TABLE 1

| Dichroic pigment No. | XVII | XVIII | XIX | XX |
|---|---|---|---|---|
| Ratio V.H.R.1hr. | 1.00 | 1.00 | 1.00 | 0.85 |
| Ratio V.H.R.100hr. | 1.00 | 1.00 | 1.00 | 0.79 | and is sufficiently suitable to a guest-host liquid crystal active matrix display element having a high voltage-holding ratio and being capable of 3.3V drive.

Example 2

A liquid crystal composition consisting of

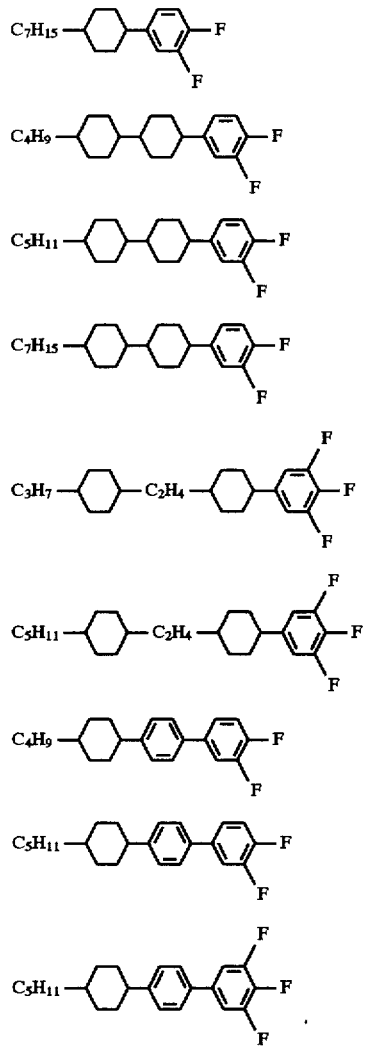

12%

13%

13%

13%

10%

9%

5%

15%

10% has the following parameters and reliabilities:

NI: 79.4° C.
η20: 24.2 mPa·s

Δn: 0.089
Δε: 5.7
ρ: $2*10^{13}$ Ω·cm

TABLE 2

| Dichroic pigment No. | XVII | XVIII | XIX | XX |
|---|---|---|---|---|
| Ratio V.H.R.1hr. | 1.00 | 1.00 | 1.00 | 0.83 |
| Ratio V.H.R.100hr. | 0.98 | 0.99 | 0.98 | 0.75 | and is sufficiently suitable to a guest-host liquid crystal active matrix display element having a high voltage-holding ratio and being capable of 3.3V drive.

Example 3

A liquid crystal composition consisting of

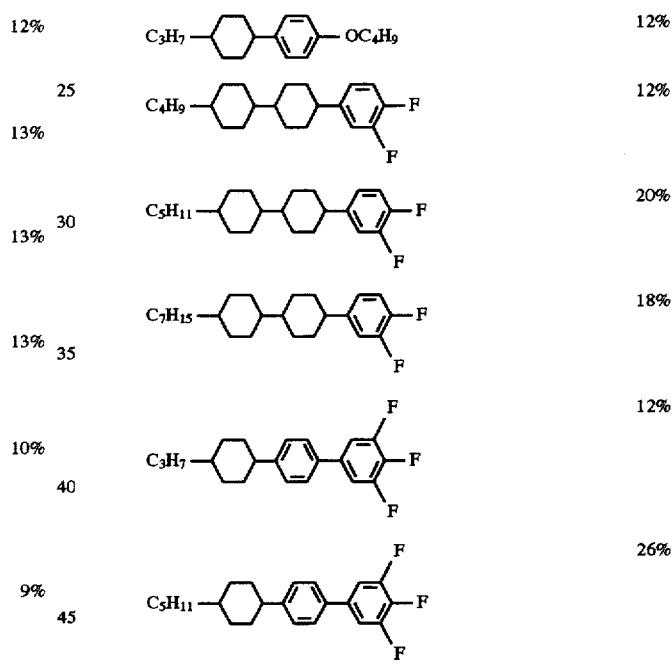

12%

12%

20%

18%

12%

26% has the following parameters and reliabilities:

NI: 84.8° C.
η20: 25.0 mPa·s
Δn: 0.097
Δε: 6.1
ρ: $2*10^{13}$ Ω·cm

TABLE 3

| Dichroic pigment No. | XVII | XVIII | XIX | XX |
|---|---|---|---|---|
| Ratio V.H.R.1hr. | 1.00 | 1.00 | 1.00 | 0.81 |
| Ratio V.H.R.100hr. | 0.98 | 0.98 | 0.98 | 0.73 | and is sufficiently suitable to a guest-host liquid crystal active matrix display element having a high voltage-holding ratio and being capable of 3.3V drive.

Example 4

A liquid crystal composition consisting of

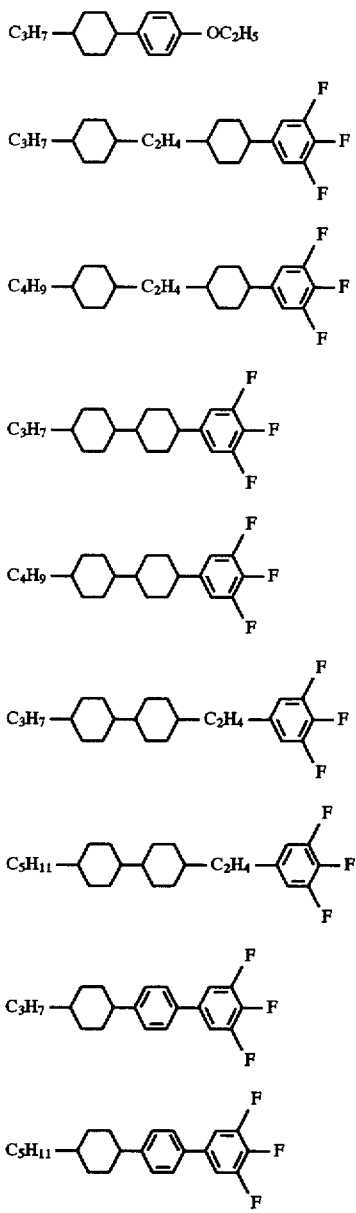

has the following parameters and reliabilities:
NI: 66.3° C.
$\eta 20$: 23.8 mPa·s
$\Delta n$: 0.089
$\Delta \epsilon$: 7.0
$\rho$: $2*10^{13}$ $\Omega$·cm

TABLE 4

| Dichroic pigment No. | XVII | XVIII | XIX | XX |
|---|---|---|---|---|
| Ratio V.H.R.1hr. | 1.00 | 1.00 | 1.00 | 0.81 |
| Ratio V.H.R.100hr. | 0.98 | 0.98 | 0.98 | 0.71 | and is sufficiently suitable to a guest-host liquid crystal active matrix display element having a high voltage-holding ratio and being capable of 3.3V drive.

Example 5

A liquid crystal composition consisting of

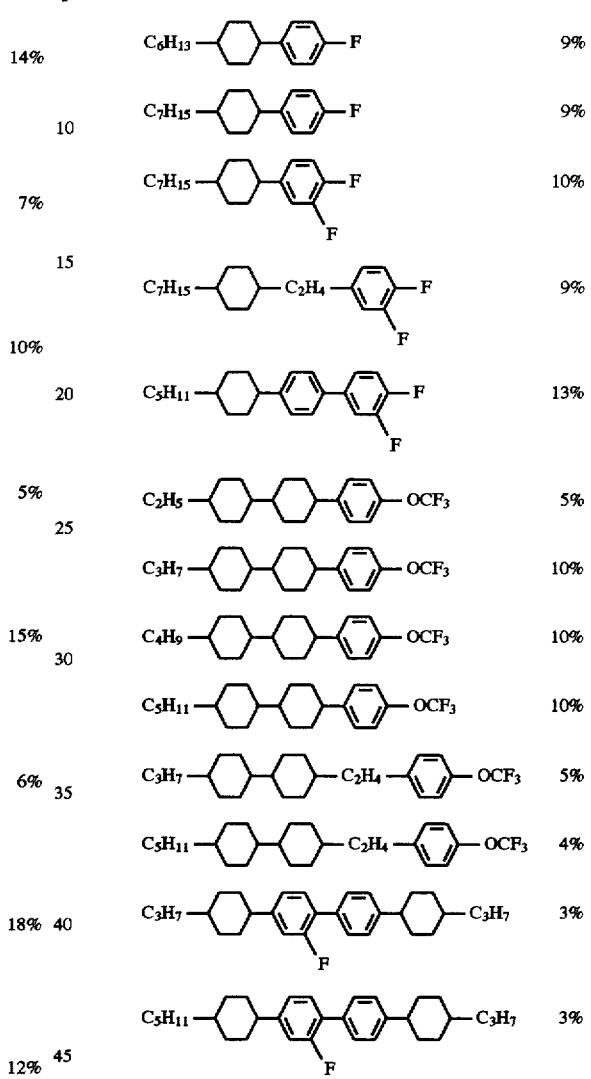

has the following parameters and reliabilities:
NI: 76.0° C.
$\eta 20$: 17.0 mPa·s
$\Delta n$: 0.080
$\Delta \epsilon$: 4.5
$\rho$: $5*10^{13}$ $\Omega$·cm

TABLE 5

| Dichroic pigment No. | XVII | XVIII | XIX | XX |
|---|---|---|---|---|
| Ratio V.H.R.1hr. | 1.00 | 1.00 | 1.00 | 0.79 |
| Ratio V.H.R. 100hr. | 0.98 | 0.99 | 0.98 | 0.73 | and is sufficiently suitable to a guest-host liquid crystal active matrix display element.

Example 6

A liquid crystal composition consisting of

| Structure | % |
|---|---|
| $C_5H_{11}$—⌬—⬡—F | 10% |
| $C_7H_{15}$—⌬—⬡—F | 10% |
| $C_2H_5$—⌬—⌬—⬡—$OCF_3$ | 7% |
| $C_3H_7$—⌬—⌬—⬡—$OCF_3$ | 7% |
| $C_5H_{11}$—⌬—⌬—⬡—$OCF_3$ | 8% |
| $C_3H_7$—⌬—⌬—COO—⬡—$OCF_3$ | 4% |
| $C_5H_{11}$—⌬—⌬—COO—⬡—$OCF_3$ | 4% |
| $C_3H_7$—⌬—⌬—⬡(F,F)—$OCHF_2$ | 18% |
| $C_5H_{11}$—⌬—⌬—⬡(F,F)—$OCHF_2$ | 18% |
| $C_3H_7$—⌬—⬡(F,F)—⬡(F)—F | 7% |
| $C_5H_{11}$—⌬—⬡(F,F)—⬡(F)—F | 7% | has the following parameters and reliabilities:

NI: 85.3° C.
η20: 22.0 mPa·s
Δn: 0.085
Δε: 6.3
ρ: $1*10^{13}$ Ω·cm

TABLE 6

| Dichroic pigment No. | XVII | XVIII | XIX | XX |
|---|---|---|---|---|
| Ratio V.H.R. 1hr. | 0.99 | 0.99 | 0.99 | 0.77 |
| Ratio V.H.R. 100hr. | 0.97 | 0.97 | 0.97 | 0.69 | and is sufficiently suitable to a guest-host liquid crystal active matrix display element having a high voltage-holding ratio and being capable of 3.3V drive.

Example 7

A liquid crystal composition consisting of

| Structure | % |
|---|---|
| $C_5H_{11}$—⌬—⬡—F | 7% |
| $C_7H_{15}$—⌬—⬡—F | 5% |
| $C_2H_5$—⌬—⌬—⬡—$OCF_3$ | 5% |
| $C_3H_7$—⌬—⌬—⬡—$OCF_3$ | 5% |
| $C_5H_{11}$—⌬—⌬—⬡—$OCF_3$ | 5% |
| $C_3H_7$—⌬—⌬—⬡(F,F)—$OCHF_2$ | 14% |
| $C_5H_{11}$—⌬—⌬—⬡(F,F)—$OCHF_2$ | 20% |
| $C_3H_7$—⌬—⬡(F,F)—⬡(F)—F | 7% |
| $C_5H_{11}$—⌬—⬡(F,F)—⬡(F)—F | 7% |
| $C_3H_7$—⌬—⬡—⬡(F)—F | 11% |
| $C_5H_{11}$—⌬—⬡—⬡(F)—F | 11% |
| $C_3H_7$—⌬—⬡(F)—⬡—⌬—$C_3H_7$ | 3% | has the following parameters and reliabilities:

NI: 86.2° C.
η20: 26.0 mPa·s
Δn: 0.101
Δε: 6.5
ρ: $1*10^{13}$ Ω·cm

TABLE 7

| Dichroic pigment No. | XVII | XVIII | XIX | XX |
|---|---|---|---|---|
| Ratio V.H.R. 1hr. | 0.98 | 0.98 | 0.98 | 0.75 |
| Ratio V.H.R. 100hr. | 0.95 | 0.96 | 0.95 | 0.68 | and is sufficiently suitable to a guest-host liquid crystal active matrix display element.

In Examples 1 to 7, as to guest-host liquid crystal compositions having 1 wt. % of an azoic pigment having a structural formula XX as a comparative example, added, the voltage-holding ratios lower; hence such liquid crystal compositions were insufficient to guest-host liquid crystal active matrix display elements.

Comparative Example 1

A liquid crystal composition consisting of

C₃H₇—⟨⟩—⟨⟩—OC₂H₅    13%

C₃H₇—⟨⟩—⟨⟩—OC₄H₉    7%

C₂H₅—⟨⟩—⟨⟩—⟨⟩-F, F    14%

C₃H₇—⟨⟩—⟨⟩—⟨⟩-F, F    15%

C₅H₁₁—⟨⟩—⟨⟩—⟨⟩-F, F    15%

C₂H₅—⟨⟩—C₂H₄—⟨⟩—⟨⟩-F, F    8%

C₃H₇—⟨⟩—C₂H₄—⟨⟩—⟨⟩-F, F    5%

C₅H₁₁—⟨⟩—C₂H₄—⟨⟩—⟨⟩-F, F    8%

C₂H₅—⟨⟩—⟨⟩—⟨⟩-F, F    4%

C₃H₇—⟨⟩—⟨⟩—⟨⟩-F, F    4%

C₅H₁₁—⟨⟩—⟨⟩—⟨⟩-F, F    7% has the following parameters and reliabilities:
NI: 84.0° C.
η20: 21.3 mPa·s
Δn: 0.087
Δε: 3.7
ρ: $1*10^{13}$ Ω·cm

TABLE 8

| Dichroic pigment No. | XVII | XVIII | XIX | XX |
|---|---|---|---|---|
| Ratio V.H.R. 1hr. | 1.00 | 1.00 | 1.00 | 0.87 |
| Ratio V.H.R. 100hr | 1.00 | 1.00 | 1.00 | 0.82 | and has a high voltage-holding ratio, but it was insufficient as a guest-host liquid crystal active matrix display element of 3.3V drive.

Comparative Example 2

A liquid crystal composition consisting of

C₇H₁₅—⟨⟩-F, F, F    2%

C₃H₇—⟨⟩—C₂H₄—⟨⟩—⟨⟩-F, F, F    12%

C₄H₉—⟨⟩—C₂H₄—⟨⟩—⟨⟩-F, F, F    10%

C₅H₁₁—⟨⟩—C₂H₄—⟨⟩—⟨⟩-F, F, F    10%

C₃H₇—⟨⟩—⟨⟩—⟨⟩-F, F, F    10%

C₅H₁₁—⟨⟩—⟨⟩—⟨⟩-F, F, F    5%

C₃H₇—⟨⟩—⟨⟩—C₂H₄—⟨⟩-F, F—OCF₃    15%

C₅H₁₁—⟨⟩—⟨⟩—C₂H₄—⟨⟩-F, F—OCF₃    10%

C₃H₇—⟨⟩—⟨⟩—⟨⟩-F, F, F    13%

C₅H₁₁—⟨⟩—⟨⟩—⟨⟩-F, F, F    13% has the following parameters and reliabilities:
NI: 75.6° C.
η20: 27.5 mPa·s
Δn: 0.087
Δε: 8.5
ρ: $1*10^{13}$ Ω·cm

TABLE 9

| Dichroic pigment No. | XVII | XVIII | XIX | XX |
|---|---|---|---|---|
| Ratio V.H.R.1hr. | 0.88 | 0.88 | 0.88 | 0.72 |
| Ratio V.H.R.100hr. | 0.78 | 0.79 | 0.77 | 0.63 | but it has a low voltage-holding ratio and was an insufficient guest-host liquid crystal active matrix display element.

Comparative Example 3

C$_3$H$_7$—⬡—⌬—OC$_2$H$_5$  13%

C$_3$H$_7$—⬡—C$_2$H$_4$—⬡—⌬(F,F,F)  14%

C$_4$H$_9$—⬡—C$_2$H$_4$—⬡—⌬(F,F,F)  7%

C$_3$H$_7$—⬡—⬡—⌬(F,F,F)  10%

C$_4$H$_9$—⬡—⬡—⌬(F,F,F)  5%

C$_3$H$_7$—⬡—⬡—C$_2$H$_4$—⌬(F,F,F)  15%

C$_5$H$_{11}$—⬡—⬡—C$_2$H$_4$—⌬(F,F,F)  6%

C$_3$H$_7$—⬡—⌬—⌬(F,F,F)  18%

C$_5$H$_{11}$—⬡—⌬—⌬(F,F,F)  12%

When 2 wt. % of a chiral dopant having the following formula XXII:

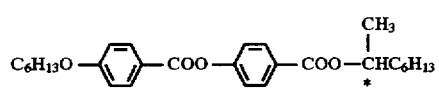

XXII was added to the liquid crystal composition of Example 4, the resulting reliabilities were as follows:

TABLE 10

| Dichroic pigment No. | XVII | XVIII | XIX | XX |
|---|---|---|---|---|
| Ratio V.H.R.1hr. | 0.85 | 0.86 | 0.85 | 0.68 |
| Ratio V.H.R.100hr. | 0.74 | 0.75 | 0.73 | 0.59 |

Thus, differently from Example 4 (wherein 4 wt. % of a chiral dopant of the formula XXI was used) the liquid crystal composition had a low voltage-holding ratio and was insufficient as a guest-host liquid crystal active matrix display element.

Example 8

A liquid crystal composition consisting of

C$_2$H$_5$—⬡—⬡—⌬(F,F)  9%

C$_3$H$_7$—⬡—⬡—⌬(F,F)  10%

C$_5$H$_{11}$—⬡—⬡—⌬(F,F)  9%

C$_3$H$_7$—⬡—C$_2$H$_4$—⬡—⌬(F,F,F)  15%

C$_4$H$_9$—⬡—C$_2$H$_4$—⬡—⌬(F,F,F)  10%

C$_5$H$_{11}$—⬡—C$_2$H$_4$—⬡—⌬(F,F,F)  15%

C$_3$H$_7$—⬡—⬡—⌬(F,F,F)  7%

C$_3$H$_7$—⬡—⬡—C$_2$H$_4$—⌬(F,F,F)  15%

C$_5$H$_{11}$—⬡—⬡—C$_2$H$_4$—⌬(F,F,F)  10% has the following parameters and order parameter (sought from di chroic ratio):
NI: 95.4° C.
SN: −20.0° C.
η20: 28.4 mPa·s
Δn: 0.075

Δε: 6.6
ρ: $5*10^{13}$ Ω·cm
order parameter: 0.78
and is sufficiently suitable to the tone display in the White-Tailor display.

Comparative Example 4

A liquid crystal composition consisting of

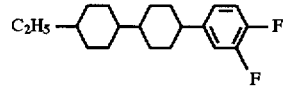 12%

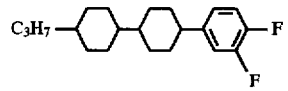 13%

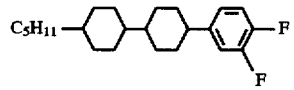 13%

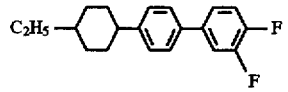 6%

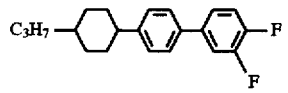 6%

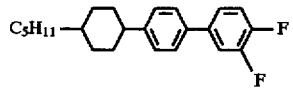 13%

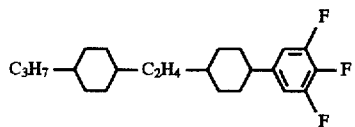 10%

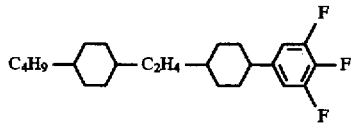 10%

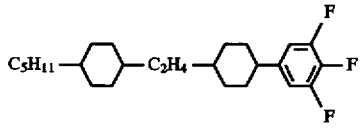 10%

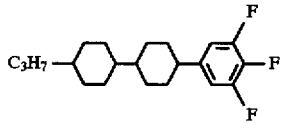 7% has the following parameters and order parameter (sought from dichroic ratio):
NI: 92.2° C.
CN: −30.0° C.
η20: 27.7 mPa·s
Δn: 0.090
Δε: 6.0
ρ: $5*10^{13}$ Ω·cm
parameter: 0.70
as compared with the composition of Example 8, the present composition is slightly inferior in the tone display grade in White-Tailor mode display.

Comparative Example 5

A liquid crystal composition consisting of

C₅H₁₁—⟨⟩—⟨⟩—Cl  6%

C₇H₁₅—⟨⟩—(F,F,F)  12%

C₃H₇—⟨⟩—C₂H₄—⟨⟩—(F,F,F)  10%

C₄H₉—⟨⟩—C₂H₄—⟨⟩—(F,F,F)  10%

C₅H₁₁—⟨⟩—C₂H₄—⟨⟩—(F,F,F)  10%

C₃H₇—⟨⟩—⟨⟩—(F,F,F)  10%

C₃H₇—⟨⟩—⟨⟩—C₂H₄—(F,F,F)  12%

C₅H₁₁—⟨⟩—⟨⟩—C₂H₄—(F,F,F)  10%

C₃H₇—⟨⟩—⟨⟩—⟨⟩—Cl  5%

C₄H₉—⟨⟩—⟨⟩—⟨⟩—Cl  10%

C₅H₁₁—⟨⟩—⟨⟩—⟨⟩—Cl  5% has the following parameters and order parameter (sought from dichroic ratio):
NI: 80.5° C.
CN: −30.0° C.
η20: 23.2 mPa·s
Δn: 0.078
Δε: 6.2
ρ: $5*10^{13}$ Ω·cm
order parameter: 0.70
and as compared with the composition of Example 8, this composition is slightly inferior in the tone display grade in the White-Tailor mode display.

DRAWINGS

EXPLANATION OF SYMBOLS

Figure 1:
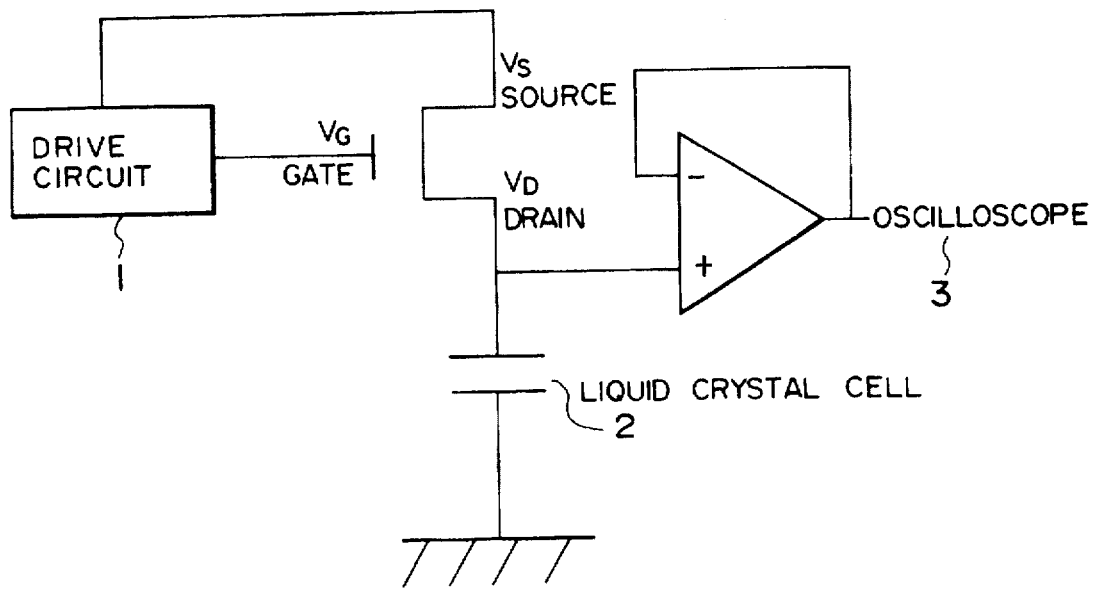
FIG. 1 shows a circuit view for measuring the voltage-holding ratio of the present invention.
Figure 2:
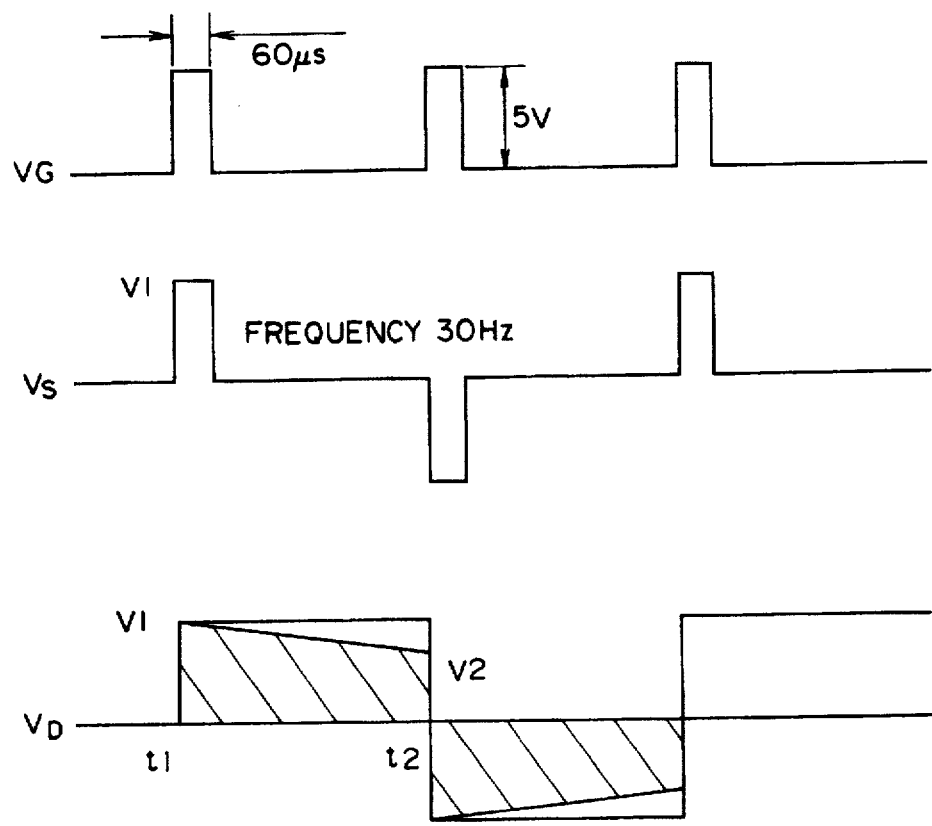
FIG. 2 shows a waveform at the time of measuring the voltage directed to FIG. 1.

1: Driving circuit
2: Liquid crystal cell
3: Oscilloscope
$V_D$: Drain voltage
$V_G$: Gate voltage
$V_S$: Source voltage
$V_1$: drain voltage at the time of $t_1$
$V_2$: drain voltage at the time of $t_2$

We claim:

1. A guest-host type liquid crystal composition comprising at least one non-azoic dichroic pigment, wherein the liquid crystal composition includes a dielectric anisotropy $\Delta\varepsilon$ of 4.5 to 7.5 and a voltage retention ratio of 0.95 or more as measured by V.H.R. for 100 hr.

2. The liquid crystal composition according to claim 1, including 70% by weight or more of at least one compound selected from the group consisting of compounds expressed by the following formula I,

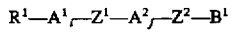   I wherein $R^1$ represents an alkyl group of 1 to 10 carbon atoms, wherein one —$CH_2$— group or two non-adjacent —$CH_2$— groups present in group $R^1$ are optionally replaced by an oxygen atom; $A^1$ and $A^2$ each independently represent a 1,4-cyclohexylene or a 1,4-phenylene group; i and j each represent 0 or 1 and i+j is 1 or 2; $Z^1$ and $Z^2$ each independently represent —COO—, —$CH_2CH_2$— or a single bond; $B^1$ represents a 3,4-difluorophenyl group or a 4-trifluoromethoxyphenyl group, said groups are respectively bonded to $Z^2$ at a 1-position thereof.

3. The liquid crystal composition according to claim 1, including as a first component, 20 to 90% by weight of at least one compound selected from the group consisting of compounds expressed by the formula I,

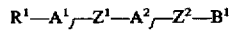   I wherein $R^1$ represents an alkyl group of 1 to 10 carbon atoms, wherein one —$CH_2$— group or two non-adjacent —$CH_2$— groups present in group $R^1$ are optionally replaced by an oxygen atom; $A^1$ and $A^2$ each independently represent a 1,4-cyclohexylene or a 1,4-phenylene group; i and j each represent 0 or 1 and i+j is 1 or 2; $Z^1$ and $Z^2$ each independently represent —COO—, —$CH_2CH_2$— or a single bond; $B^1$ represents a 3,4-difluorophenyl group or a 4-trifluoromethoxyphenyl group, wherein $B^1$ is bonded to $Z^2$ at a 1-position thereof; and, as a second component, 3 to 74% by weight of at least one compound selected from the group consisting of compounds expressed by the formula II,

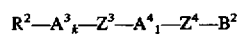   II wherein $R^2$ represents an alkyl group of 1 to 10 carbon atoms, wherein one —$CH_2$— group or two non-adjacent —$CH_2$— groups present in group $R^2$ are optionally replaced by an oxygen atom; $A^3$ and $A^4$ each independently represent 1,4-cyclohexylene or 1,4-phenylene; k and l each represent 0 or 1 and k+l=1 or 2; $Z^3$ and $Z^4$ each independently represent —COO—, —$CH_2CH_2$— or a single bond; $B^2$ represents a 3,4,5-trifluorophenyl group or a 3,5-difluoro-4-difluoromethoxyphenyl group, each bonded to $Z^4$ at a 1-position thereof; and when $B^2$ represents a 3,5-difloro-4-difluoromethoxyphenyl group, $A^3$ and $A^4$ each represent 1,4-cyclohexylene and k and l each represent 1 and $Z^3$ and $Z^4$ each represent a single bond; and as another component, 0 to 77% by weight of another liquid crystalline compound.

4. The liquid crystal composition according to claim 3, including as a third component, 3 to 30% by weight of at least one compound selected from the group consisting of compounds expressed by the following formula III:

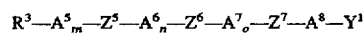   III wherein $R^3$ represents an alkyl group of 1 to 10 carbon atoms, wherein one —$CH_2$— group or two non-adjacent —$CH_2$— groups present therein are optionally replaced by an oxygen atom; $A^5$, $A^6$, $A^7$ and $A^8$ each independently represent 1,4-cyclohexylene or 1,4-phenylene; m, n and o each represent 0 or 1 and m+n+o=1, 2 or 3; $Z^5$, $Z^6$ and $Z^7$ each independently represent —COO—, —$CH_2CH_2$— or a single bond; $Y^1$ represents a halogen atom, an alkyl group, an alkoxy group or an alkoxyalkyl group, and when $Y^1$ represents an alkyl group, an alkoxy group or an alkoxyalkyl group, if $A^6$ represents 1,4-phenylene, an H atom at a 3-position thereof is optionally replaced by an F atom.

5. The liquid crystal composition according to claim 1, including as a first component, 50 to 88% by weight of at least one compound selected from the group consisting of compounds expressed by the following formula II; as a second component, 7 to 40% by weight of at least one compound selected from the group consisting of compounds expressed by the following formula III; and 0 to 40% by weight of another liquid crystalline compound,

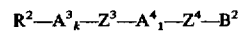   II wherein $R^2$ represents an alkyl group of 1 to 10 carbon atoms, wherein one —$CH_2$— group or two non-adjacent —$CH_2$— groups present therein are optionally replaced by an oxygen atom; $A^3$ and $A^4$ each independently represent 1,4-cyclohexylene or 1,4-phenylene; k and l each represent 0 or 1 and k+l=1 or 2; $Z^3$ and $Z^4$ each independently represent —COO—, —$CH_2CH_2$— or a single bond; and $B^2$ represents a 3,4,5-trifluorophenyl group or a 3,5-difluoro-4-difluoromethoxyphenyl group, and when $B^2$ represents a 3,5-difloro-4-difluoromethoxyphenyl group, $A^3$ and $A^4$ each represent 1,4-cyclohexylene and k and l each represent 1 and $Z^3$ and $Z^4$ each represent a single bond,

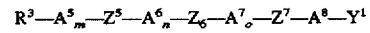   III wherein $R^3$ represents an alkyl group of 1 to 10 carbon atoms, wherein one —$CH_2$— group or two non-adjacent —$CH_2$— groups present therein are optionally replaced by an oxygen atom; $A^5$, $A^6$, $A^7$ and $A^8$ each independently represent 1,4-cyclohexylene or 1,4-phenylene; m, n and o each represent 0 or 1 and m+n+o=1, 2 or 3; $Z^5$, $Z^6$ and $Z^7$ each independently represent —COO—, —$CH_2CH_2$— or a single bond; $Y^1$ represents a halogen atom, an alkyl group, an alkoxy group or an alkoxyalkyl group and when $Y^1$ represents an alkyl group, an alkoxy group or an alkoxyalkyl group, if $A^6$ represents 1,4-phenylene, an H atom at a 3-position thereof is optionally replaced by an F atom.

6. The liquid crystal composition according to claim 4, including as a fourth component, 3 to 30% by weight of at least one compound selected from the group consisting of compounds expressed by the following formula IV:

$$R^4\text{—}A^9_p\text{—}Z^8\text{—}A^{10}_q\text{—}Z^9\text{—}A^{11}_r\text{—}Z^{10}\text{—}A^{12}\text{—}Y^2 \qquad \text{IV}$$

wherein $R^4$ represents an alkyl group of 1 to 10 carbon atoms wherein one —$CH_2$— group or two non-adjacent —$CH_2$— groups present in $R^4$ are optionally replaced by an oxygen atom; $A^{12}$ represents 1,4-phenylene; $A^9$, $A^{10}$ and $A^{11}$ each independently represent 1,4-cyclohexylene or 1,4-phenylene, but either one thereof is always 1,4-phenylene; three or more H atoms selected from those at a 3-position or a 5-position of $A^9$, $A^{10}$, $A^{11}$ and $A^{12}$ are optionally replaced by an F atom; p, q and r each represent 0 or 1, and p+q+r=1, 2 or 3; $Z^8$, $Z^9$ and $Z^{10}$ each independently represent —COO—, —$CH_2CH_2$— or a single bond; and $Y^2$ represents a halogen.

7. The liquid crystal composition according to claim 6, wherein, in the formula I, $R^1$ represents an alkyl group of 1 to 10 carbon atoms; $A^1$ and $A^2$ each independently represent 1,4-cyclohexylene or 1,4-phenylene; i and j each represent 0 or 1 and i+j=1 or 2; $Z^1$ and $Z^2$ each independently represent —COO—, —$CH_2CH_2$— or a single bond; and $B^1$ represents a 3,4-difluorophenyl group or a 4-trifluoromethoxyphenyl group, bonded to $Z^2$ at a 1-position thereof, in the formula II, $R^2$ represents an alkyl group of 1 to 10 carbon atoms; $A^3$ and $A^4$ each independently represent 1,4-cyclohexylene or 1,4-phenylene; k and l represent 0 or 1 and k+l=1 or 2; $Z^3$ and $Z^4$ each independently represent —COO—, —$CH_2CH_2$— or a single bond; $B^2$ represents a 3,4,5-trifluorophenyl group or a 3,5-difluoro-4-difluoromethoxyphenyl group, wherein said groups are bonded to $Z^4$ at a 1-position thereof; and when $B^2$ represents a 3,5-difloro-4-difluoromethoxyphenyl group, $A^3$ and $A^4$ each represent 1,4-cyclohexylene; k and l each represent 1 and $Z^3$ and $Z^4$ each represent a single bond, in the formula III, $R^3$ represents an alkyl group of 1 to 10 carbon atoms; $A^5$, $A^6$, $A^7$ and $A^8$ each independently represent 1,4-cyclohexylene or 1,4-phenylene; m, n and o each represent 0 or 1 and m+n+o represents 1, 2 or 3; $Z^5$, $Z^6$ and $Z^7$ each independently represent —COO—, —$CH_2CH_2$— or a single bond; $Y^1$ represents a halogen atom, an alkyl group, an alkoxy group or an alkoxyalkyl group, and when $Y^1$ represents an alkyl group, if $A^6$ represents 1,4-phenylene, an H atom at a 3-position thereof is optionally replaced by an F atom, and in the formula IV, $R^4$ represents an alkyl group of 1 to 10 carbon atoms; $A^{12}$ represents 1,4-phenylene; $A^9$, $A^{10}$ and $A^{11}$ each independently represent 1,4-cyclohexylene or 1,4-phenylene, but either one thereof is always 1,4-phenylene, and 3 or more H atoms from those at a 3-position or a 5-position on $A^9$, $A^{10}$ or $A^{11}$ are optionally replaced by an F atom; p, q and r each represent 0 or 1; p q+r represents 1, 2 or 3; $Z^8$, $Z^9$ and $Z^{10}$ each represent a single bond; and $Y^2$ represents a halogen atom.

8. The liquid crystal composition according to claim 1, including a smectic phase between a nematic phase and a crystalline phase.

9. The liquid crystal composition according to claim 1, wherein the non-azoic dichroic pigment is a quinophthalone pigment or an anthraquinone pigment represented by the following formulas V to XIII:

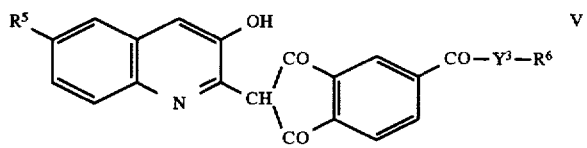

wherein $Y^3$ represents an O atom or an S atom; $R^5$ represents an H atom or an alkyl group; $R^6$ represents and alkyl group or a cycloalkyl group, an alkoxyalkyl group, an aryl group or an aralkyl group,

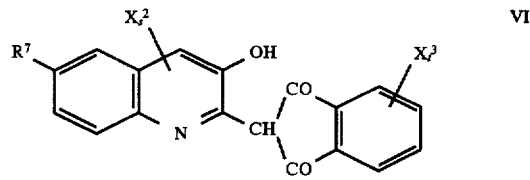

wherein $R^7$ represents an H atom or an alkyl group; $X^2$ represents an H atom, a halogen atom or a compound expressed by the following formula VI-1; s represents 1 or 2; $X^3$ represents an H atom, a halogen atom or a group represented by the following formula VI-1:

wherein $R^8$ and $R^9$ each represent an H atom, an alkyl group, an alkoxyalkyl group or a cyclohexyl group optionally having a substituent of an alkoxy group or a phenyl group which optionally includes a substituent of an alkyl group or an alkoxy group; and t represents 1 or 2, but when $X^2$ represents the formula VI-1, t represents 1,

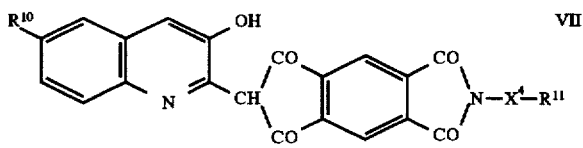

wherein $R^{10}$ represents an H atom, a halogen atom, an alkyl group, an alkoxyalkyl group, an alkoxy group, an alkylphenyl group, an alkoxyphenyl group or a group expressed by the following formula VII-1:

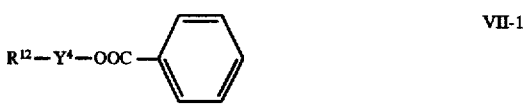

wherein $R^{12}$ represents an H atom, an alkyl group, an alkoxyalkyl group or an alkoxy group; $Y^4$ represents a 1,4-phenylene group or a 1,4-cyclohexylene group; $R^{11}$ represents an H atom, a halogen atom, an alkyl group, an alkoxyalkyl group or an alkoxy group; and $X^4$ represents a phenylene group which optionally includes a halogen group, an alkyl group or an alkoxy group at an ortho position or a meta position thereof,

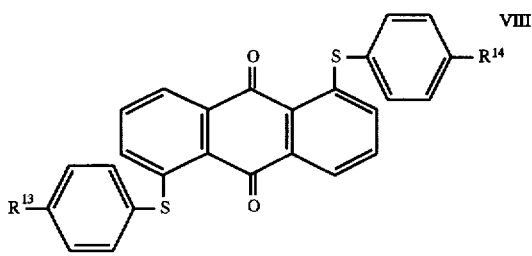

wherein $R^{13}$ and $R^{14}$ each represent an H atom, a halogen atom, an alkyl group, a cycloalkyl group, an alkoxyalkyl group or an alkoxy group,

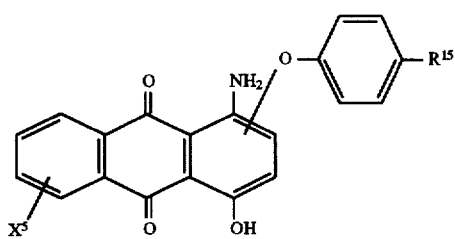

wherein $R^{15}$ represents an H atom, a halogen atom, an alkyl group, an alkoxyalkyl group or an alkoxy group or a cyclohexyl group which optionally includes an alkoxy group or an alkyl group; and $X^5$ represents an H atom, a halogen atom or a carboxylic acid ester group which optionally includes a substituent,

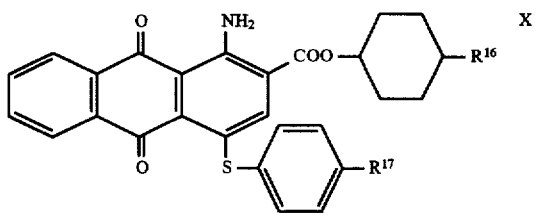

wherein $R^{16}$ and $R^{17}$ each represent an H atom, a halogen atom, an alkyl group, an alkoxyalkyl group or a cyclohexyl group which optionally includes an alkoxy group or an alkyl group,

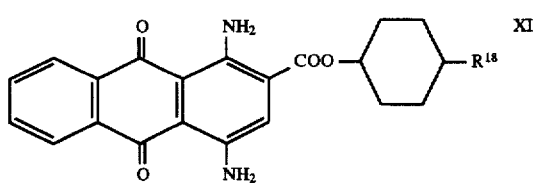

wherein $R^{18}$ represents an H atom, an alkyl group, an alkoxyalkyl group, an alkoxy group or a halogen atom,

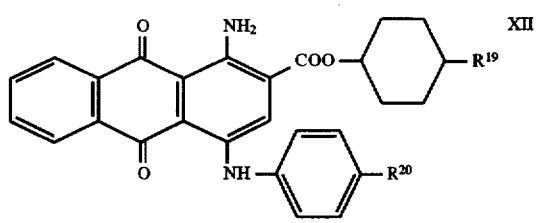

wherein $R^{19}$ and $R^{20}$ each represent an H atom, an alkyl group, an alkoxyalkyl group, an alkoxy group or a halogen atom, and

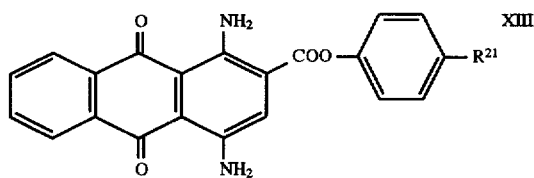

wherein $R^{21}$ represents an H atom, an alkyl group, an alkoxyalkyl group, an alkoxy group or a halogen atom.

10. The liquid crystal composition according to claim 1, including an optically active substance represented by the following formulas to XIV to XVI:

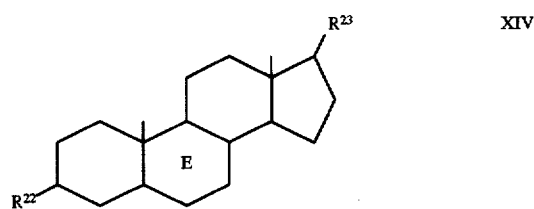

wherein $R^{22}$ represents an H atom, a halogen atom, an alkyl group, an alkoxyalkyl group, an alkanoyl group, an alkoxy group, an alkanoyloxy group, or a cyclohexyl group or a phenyl group which optionally includes an alkanoyl group, an alkanoyloxy group, an alkoxy group or an alkyl group; $R^{23}$ represents an alkyl group; and the ring E represents a condensed ring having only one double bond without sharing it with another ring, or a condensed ring which is optionally replaced by an alkyl group or an alkoxy group at a 5-position or a 6-position thereof, $$R^{24}-A^{13}{}_u-Z^{11}-A^{14}-Z^{12}-A^{15}-Y^5 \quad \text{XV}$$

wherein $R^{24}$ represents an alkyl group; $A^{13}$, $A^{14}$ and $A^{15}$ each independently represent 1,4-cyclohexylene or 1,4-phenylene and an H atom at a lateral position of the 1,4-phenylene may be optionally replaced by an F atom; u represents an integer of 0 or 1; $Z^{11}$ and $Z^{12}$ each represent a single bond or —$CH_2CH_2$—, but do not simultaneously represent —$CH_2CH_2$—; and $Y^5$ is represented by the following partial formula XVI:

$$-O_v-(CH_2)_w-C^*HR^{25}-R^{26} \quad \text{XVI}$$

wherein v and w each independently represent an integer of 0 or 1; $R^{25}$ represents an F atom or a methyl group; and $R^{26}$ represents an alkyl group or two or more carbon atoms.

11. A liquid crystal display element comprising a liquid crystal composition according to claim 1.

12. A liquid crystal display element comprising a liquid crystal composition according to claim 2.

13. A liquid crystal display element comprising a liquid crystal composition according to claim 3.

14. A liquid crystal display element comprising a liquid crystal composition according to claim 4.

15. A liquid crystal display element comprising a liquid crystal composition according to claim 5.

16. A liquid crystal display element comprising a liquid crystal composition according to claim 6.

17. A liquid crystal display element comprising a liquid crystal composition according to claim 7.

18. A liquid crystal display element comprising a liquid crystal composition according to claim 8.

19. A liquid crystal display element comprising a liquid crystal composition according to claim 9.

20. A liquid crystal display element comprising a liquid crystal composition according to claim 10.

* * * * *